US012711596B2

(12) United States Patent
Lin et al.

(10) Patent No.: US 12,711,596 B2
(45) Date of Patent: Aug. 18, 2026

(54) AUTOMATIC CALCULATION METHOD FOR SURFACE DEFECT AREA OF WET BLUE SKIN BASED ON DEEPLABV3+ MODEL

(71) Applicants: SICHUAN UNIVERSITY, Chengdu City (CN); SICHUAN CHUANGZHIWEIYE TECHNOLOGY CO., LTD., Chengdu City (CN)

(72) Inventors: Wei Lin, Chengdu City (CN); Changping Huang, Chengdu City (CN); Chunhua Wang, Chengdu City (CN); Jianfei Zhou, Chengdu City (CN); Youcheng Tang, Chengdu City (CN); Jianhui Wu, Chengdu City (CN); Hexiang Dong, Chengdu City (CN); Le Yang, Chengdu City (CN); Long Zhang, Chengdu City (CN)

(73) Assignees: SICHUAN UNIVERSITY, Chengdu City (CN); SICHUAN CHUANGZHIWEIYE TECHNOLOGY CO., LTD., Chengdu City (CN)

( * ) Notice: Subject to any disclaimer, the term of this patent is extended or adjusted under 35 U.S.C. 154(b) by 141 days.

(21) Appl. No.: 18/759,709

(22) Filed: Jun. 28, 2024

(65) Prior Publication Data

US 2026/0004411 A1 Jan. 1, 2026

(51) Int. Cl.
*G06T 7/00* (2017.01)

(52) U.S. Cl.
CPC .. *G06T 7/0002* (2013.01); *G06T 2207/20081* (2013.01); *G06T 2207/20084* (2013.01)

(58) Field of Classification Search
CPC .................... G06T 2207/30124; G06T 7/0004
See application file for complete search history.

(56) References Cited

FOREIGN PATENT DOCUMENTS

| | | | | | |
|---|---|---|---|---|---|
| CN | 115456987 A | * | 12/2022 | ........... | G06T 7/0004 |
| CN | 115731198 A | * | 3/2023 | | |

(Continued)

OTHER PUBLICATIONS

S. Xu et al., "Flexible Material Quality Assessment Based on Visual-Tactile Fusion," in IEEE Transactions on Instrumentation and Measurement, vol. 73, pp. 1-10, 2024, Art No. 5017810 (Year: 2024).*

(Continued)

*Primary Examiner* — Gandhi Thirugnanam
(74) *Attorney, Agent, or Firm* — Chiesa Shahinian & Giantomasi PC

(57) ABSTRACT

Provided is an automatic calculation method for a surface defect area of a wet blue skin based on a DeeplabV3+ model, aiming at solving the problem that the automatic calculation of the surface defect area is difficult in a tannery. The method includes image data acquisition and preprocessing of a wet blue skin, training and verification of a wet blue skin surface defect segmentation model based on a DeeplabV3+ model, and automatic calculation of the surface defect area in a segmented image. The method can accurately segment common defects such as knife holes, brands and the like on the surface of a large-area wet blue skin, with a high speed of detecting a wet blue skin within 1 s.

5 Claims, 2 Drawing Sheets

(56) References Cited

FOREIGN PATENT DOCUMENTS

| | | | | | |
|---|---|---|---|---|---|
| CN | 115984182 | A | * | 4/2023 | |
| CN | 116363194 | A | * | 6/2023 | ............... G06T 7/62 |
| WO | WO-2017222489 | A1 | * | 12/2017 | ............. G06V 40/10 |

OTHER PUBLICATIONS

S.-Y. Chen, Y.-C. Cheng, W.-L. Yang and M.-Y. Wang, "Surface Defect Detection of Wet-Blue Leather Using Hyperspectral Imaging," in IEEE Access, vol. 9, pp. 127685-127702, 2021 (Year: 2021).*

Aslam, Masood & Khan, Tariq & Naqvi, Syed & Holmes, Geoffrey & Naffa, Rafea. (2019). On the Application of Automated Machine Vision for Leather Defect Inspection and Grading: A Survey. (Year: 2019).*

* cited by examiner

AUTOMATIC CALCULATION METHOD FOR SURFACE DEFECT AREA OF WET BLUE SKIN BASED ON DEEPLABV3+ MODEL

TECHNICAL FIELD

The present disclosure belongs to the detection field of the wet blue skin surface defects, in particular to an automatic calculation method for a surface defect area of a wet blue skin based on a Deeplab V3+ model.

BACKGROUND

A wet blue skin is an intermediate product in the tanning process, which is made from hide and skin by deoiling, degreasing, depilation and chrome tanning. Such product is excellent in stability, which can not only be processed into leather in the next stage, but also be directly traded to other manufacturers in need. Before the next stage of processing or trading, it is necessary to grade the quality of the wet blue skin. Usually, a quality inspector not only observes the types and distribution of defects on the surface of the wet blue skin to determine its grade, but also needs to estimate the areas of different defects to determine the grade of the wet blue skin finally. However, there are subjective and inefficient problems in the method of manually estimating the defect area, and there may be great differences in estimating the defect area on the same wet blue skin surface by different quality inspectors. After working for a long time, quality inspectors are also prone to misjudge the quality grade of leathers.

In order to solve these problems, the DeeplabV3+ model developed based on deep learning is used to train the wet blue skin surface defect segmentation model to automatically detect the wet blue skin. The surface defect part of the wet blue skin is distinguished from the normal part, and different defects are identified by different colors, so that the surface defect area of the wet blue skin can be calculated efficiently and accurately. The DeeplabV3+ model is a semantic segmentation model based on deep learning, which is used to classify pixels in an image. The model uses a structure of deep convolution neural network, which can effectively learn the high-level features of the image, and then accurately segment different defect targets. By using such automatic detection method, the quality of the wet blue skin can be automatically evaluated, which avoids the uncertainty and errors resulted from traditional subjective estimation methods and improves the accuracy and efficiency of evaluation of the quality of the wet blue skin.

SUMMARY

Aiming at the problems in the prior art, the present disclosure provides an automatic calculation method for a surface defect area of a wet blue skin based on a DeeplabV3+ model. The basic principle of the method is to use a trained DeeplabV3+ model to automatically detect the defect in the wet blue skin image and segment the defect. On the basis of the proportion of each defect in the image after calculated, the automatic calculation of the surface defect area can be realized by the product of the proportion of each defect and the actual area of the wet blue skin.

The present disclosure provides an automatic calculation method for a surface defect area of a wet blue skin based on a DeeplabV3+ model, which includes following steps:

Step 1, using an industrial camera to acquire more than 500 wet blue skin image samples of animal skins after main tanning, where the animal skins comprising cowhides, sheepskins, and pigskins; performing preprocessing, comprising cropping and selecting, on the wet blue skin images acquired, and carrying out data annotation on preprocessed images with an annotation software to construct a wet blue skin surface defect semantic segmentation data set;

Step 2, training a DeeplabV3+ model by using the wet blue skin surface defect semantic segmentation data set created, obtaining a wet blue skin surface defect segmentation model based on the DeeplabV3+ model;

Step 3, using the wet blue skin surface defect segmentation model based on the DeeplabV3+ model trained to conduct defect detection on the wet blue skin image, and acquiring segmentation result images of different defects in the image, and calculating a proportion of each defect in the image ($k_i$);

Step 4: calculating actual surface defect area of a wet blue skin according to following equations:

$$S_t = \Sigma_{i=1}^{n} S \times k_i,$$

$$S = 4 \times H^2 \times \tan\frac{\alpha}{2} \times \tan\frac{\beta}{2},$$

where S is an actual area captured by the camera, H is a distance between the camera and the wet blue skin, α is a horizontal field of view of the camera, β is a vertical field of view, $S_t$ is an actual surface defect area, and $k_i$ is the proportion coefficient of different defects in the image.

In an embodiment of the present disclosure, Step 1 includes following steps:

1-1: acquisition of wet blue skin images including: erecting a whole image acquisition system on a skin selection machine, and then installing a light-emitting diode (LED) white light source on a frame so that light is evenly distributed on a surface of the skin selection machine, and adjusting a distance between cameras appropriately according to a shooting range of the cameras to make the cameras to be able to capture tiny defects;

1-2: preprocessing of an acquired wet blue skin image including: performing cropping from an upper left corner of an original image of the wet blue skin by using two sliding windows with different sizes, after a current cropping is completed, sliding to a next area for cropping by using a predetermined number of pixels as a step size, where a part beyond a boundary of the wet blue skin image is filled with "None" if a cropping area after sliding exceeds the boundary of the wet blue image;

1-3: screening cropped images to screen out images in which the wet blue skin has defect;

1-4: labeling defect region in image data by using annotation tool labelme, where an annotation box is tightly attached to an outermost edge of the defect;

1-5: after annotation, dividing all the wet blue skin image data randomly, and using 80% of the wet blue skin images as the wet blue skin image samples in a training set and 20% of the wet blue skin images as the wet blue skin image samples in a verification set.

In an embodiment of the present disclosure, Step 2 includes following steps:

2-1: using, by the DeeplabV3+ model, lightweight MobilenetV2 network as backbone feature extraction network, and incorporating technologies such as dilated convolution and spatial pyramid pooling to improve real-time performance and segmentation accuracy;

2-2: using a multi-classification cross entropy loss function to calculate a loss between predicted semantic segmentation map and manually annotated real semantic segmentation map, and optimizing parameters of a neural network by back propagation algorithm;

2-3: evaluating a final weight parameter file obtained in training stage by using the verification set, and automatically adjusting a hyperparameter to optimize model performance according to evaluation results of the verification set.

In an embodiment of the present disclosure, Step 3 includes following steps:

3-1: inputting an original wet blue skin image that does not participate in constructing the training data set and the verification data set into a trained wet blue skin surface defect segmentation model so as to segment surface defects of the wet blue skin, where all the defects in the image are segmented after being processed, and different defects are annotated with different colors;

3-2: calculating the proportional coefficient $k_i$ (i=1, 2, 3 . . . ) of different defects (i) in the image with segmentation result according to the number of pixels contained in different defects in the segmentation result.

In an embodiment of the present disclosure, Step 4 includes following steps:

4-1: calculation of the actual area captured by the camera, as shown in FIG. 2, including: calculating the actual area of a captured image by using the distance between the camera and the wet blue skin and a field of view of the camera, which is expressed as follow:

$$S = 4 \times H^2 \times \tan\frac{\alpha}{2} \times \tan\frac{\beta}{2},$$

where S is the actual area, H is the distance between the camera and the wet blue skin, α is the horizontal field of view of the camera, β is the vertical field of view;

4-2: calculating the actual surface defect area by using the actual area of the captured image and the proportional coefficient of defects in Step 3, which is expressed as follow:

$$S_t = \Sigma_{i=1}^{n} S \times k_i,$$

where $S_t$ is the actual surface defect area, and $k_i$ is the proportion coefficient of different defects in the image.

In an embodiment of the present disclosure, the automatic calculation method for a surface defect area of a wet blue skin using a DeeplabV3+ semantic segmentation model, includes a Deeplab V3+ model and a MobileNetV2 network.

The DeepLabV3+ model is a semantic segmentation model, which uses a structure of an encoder and a decoder. In an encoder part, the MobileNetV2 network is used as a backbone network. Feature map extracted by the MobilenetV2 model backbone network is processed through Atrous Spatial Pyramid Pooling (ASPP) network structure by using dilated convolution with different dilation rates to acquire multi-scale information. In a decoder part, low-level features and high-level features are fused in a manner of skip connection. First, low-level feature map is convolved by 1×1 convolution to reduce the number of channels of feature map. Thereafter, multi-scale high-level features are up-sampled at 4 times through bilinear interpolation and are fused with processed low-level features. Subsequently, total fused feature information is subjected to a simple feature fusion through 3×3 convolution. Finally, consolidated feature map is up-sampled at 4 times through bilinear interpolation and restored to a size of input image.

The Mobile ETV 2 network is a backbone network of the DeeplabV3+ model, which is proposed by Google and is a lightweight network. The network greatly is suitable for mobile devices and embedded devices due to its performance of great reduction in the network parameters upon a slight decrease in accuracy. The MobileNetV2 network inherits depthwise separable convolution of the MobileNetV1 network and uses bottleneck layer connected with inverted residuals. First, dimension is increased by 1×1 convolution, then features are extracted by 3×3 depthwise separable convolution, and finally the dimension is decreased by 1×1 convolution. A normalization layer and ReLU6 activation function are added after dimension increasing and depthwise-separable convolution. And only standardization is used after dimension decreasing, without the activation function. This is because using the nonlinear activation function in a low dimension will lose a lot of information, and nonlinear activation in a high dimension after dimension increasing can greatly alleviate information loss. Input and output are directly connected by short-cut, which is used to solve vanishing gradient problem in process of training a deep convolutional network.

Compared with the prior art, the present disclosure has the following beneficial effects.

1. The present disclosure provides an automatic calculation method for a surface defect area of a wet blue skin based on the DeeplabV3+ model;
2. The MobileNetV2 network is used in backbone feature extraction part of the DeepLabV3+ model, which greatly reduces the calculation time and the number of parameters and improves the real-time performance of defect segmentation.
3. Compared with existing calculation method for the surface defect area of the wet blue skin, the method of the present disclosure uses a semantic segmentation model combined with an automatic area calculation algorithm, and has the advantages of being high in accuracy, in rate of identifying defects, and in degree of automatic calculation of the surface defect area, which can improve the automation and quantification level of the quality grading of the wet blue skin.

BRIEF DESCRIPTION OF THE DRAWINGS

In order to explain the technical scheme of the embodiments of the present disclosure more clearly, the drawings will be briefly introduced hereinafter. It should be understood that the following drawings only show some embodiments of the present disclosure, which should not be regarded as limiting the scope. For those skilled in the art, other relevant drawings can be obtained according to these drawings without creative labor.

DETAILED DESCRIPTION OF THE EMBODIMENTS

The technical scheme in the embodiment of the present disclosure will be clearly and completely described with reference to the attached drawings hereinafter. Obviously, the described embodiments are only some embodiment of the present disclosure, rather than all of the embodiments. Based on the embodiments in the present disclosure, other embodiments obtained by those skilled in the art without creative labor are all within the scope of protection of the present disclosure.

Embodiment 1

Figure 1:
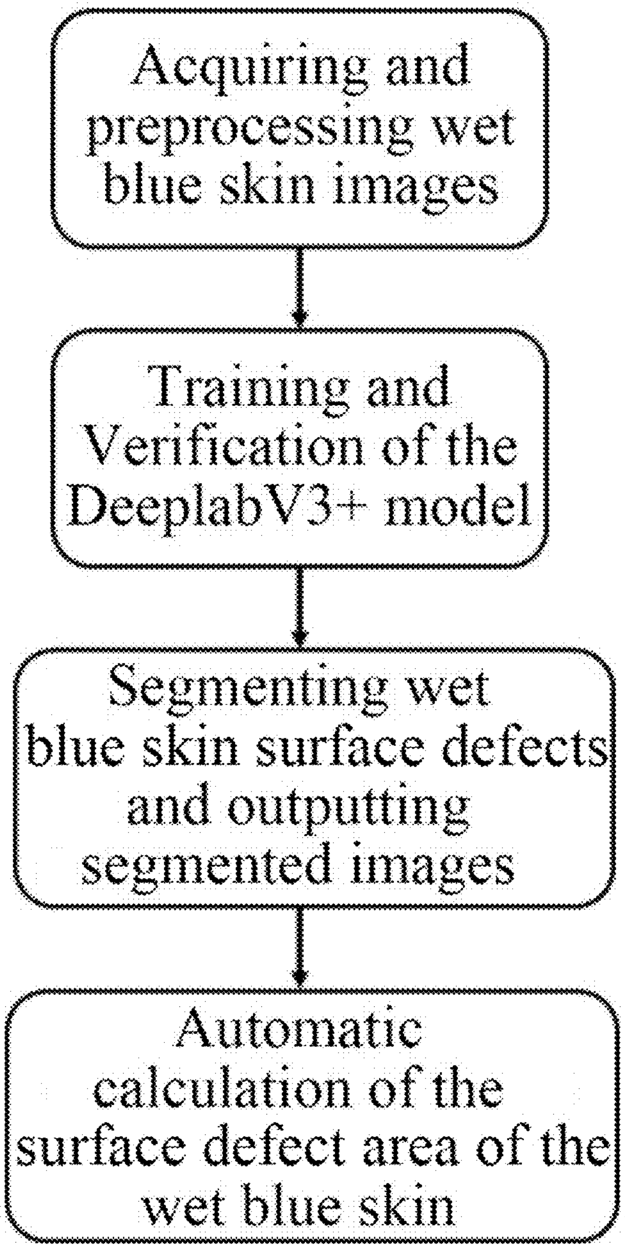
FIG. 1 is a flowchart of a specific embodiment of an automatic calculation method for a surface defect area of a wet blue skin based on a DeeplabV3+ model according to the present disclosure.

As shown in FIG. 1, in this embodiment, the method proposed by the present disclosure is used to automatically calculate the surface defect area of the wet blue skin after main tanning of cowhides, which includes following steps:

Step 1, using an industrial camera to acquire 500 images of cowhides after main tanning, performing preprocessing, such as cropping and selecting, on acquired wet blue skin images, and carrying out data annotation on preprocessed images with annotation software to construct a wet blue skin surface defect semantic segmentation data set;

Step 2, training the DeeplabV3+ model by using the wet blue skin defect semantic segmentation data set constructed, to obtain a wet blue skin surface defect segmentation model based on the Deeplab V3+ model; and Step 3, using the trained wet blue skin surface defect segmentation model based on the Deeplab V3+ model to conduct defect detection on the wet blue skin image, and acquiring segmented images of different defects in the images, and calculating proportion of each defect in the image ($k_i$);

Step 4: calculating actual surface defect area of the wet blue skin according to the following equations:

$$S_t = \Sigma_{i=1}^{n} S \times k_i,$$

$$S = 4 \times H^2 \times \tan\frac{\alpha}{2} \times \tan\frac{\beta}{2};$$

where S is the actual area captured by the camera, H is the distance between the camera and the wet blue skin, α is a horizontal field of view of the camera, β is the vertical field of view, $S_t$ is the actual surface defect area, and $k_i$ is the proportion coefficient of different defects in the image.

Embodiment 2

According to the present disclosure, the DeepLabV3+ model is used to train the wet blue skin surface defect segmentation model. The DeepLabV3+ model is a semantic segmentation model, which uses the structure of an encoder and a decoder. In the encoder part, the MobileNetV2 network is used as the backbone network. The feature map extracted by the MobilenetV2 model as backbone network is processed through the ASPP structure by using dilated convolution with different dilation rates to acquire multi-scale information. In the decoder part, low-level features and high-level features are fused in a manner of skip connection. First, the low-level feature map is convolved by 1×1 convolution to reduce the number of channels of the feature map. Thereafter, the multi-scale high-level features are up-sampled at 4 times through bilinear interpolation and are fused with the processed low-level features. Subsequently, the total fused feature information is subjected to a simple feature fusion through 3×3 convolution. Finally, the consolidated feature map is up-sampled at 4 times through bilinear interpolation and restored to the size of the input image.

Embodiment 3

According to the present disclosure, lightweight MobilenetV2 network is used as the backbone feature extraction network of the DeeplabV3+ model, which, in combination with technologies such as dilated convolution and spatial pyramid pooling, improves the real-time performance and the segmentation accuracy. The Mobile ETV 2 network is the backbone network of the Deeplab V3+ model, which is proposed by Google and is a lightweight network. The network is suitable for mobile devices and embedded devices due to its performance of great reduction in the network parameters upon a slight decrease in accuracy. The MobileNetV2 network inherits the depthwise separable convolution of the MobileNetV1 network and uses the bottleneck layer connected with inverted residuals. First, the dimension is increased by 1×1 convolution, then the features are extracted by 3×3 depthwise separable convolution, and finally the dimension is decreased by 1×1 convolution. The normalization layer and the ReLU6 activation function are added after dimension increasing and depthwise separable convolution, only standardization is used after dimension decreasing, without the activation function. This is because using the nonlinear activation function in a low dimension will lose a lot of information, and nonlinear activation in a high dimension after dimension increasing can greatly alleviate information loss. The input and the output are directly connected by resnet, which is used to solve the vanishing gradient problem in the process of training the deep convolutional network.

Embodiment 4

Figure 2:
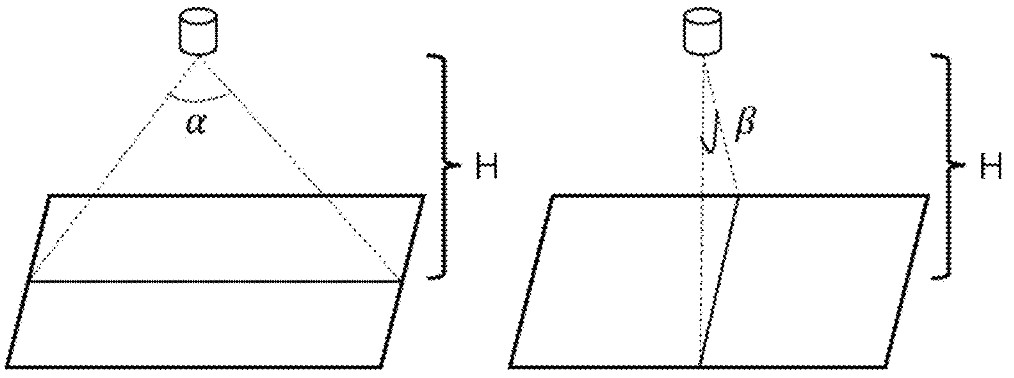
FIG. 2 is a schematic diagram of calculation of an actual area of a wet blue skin.

Referring to FIG. 2, a schematic diagram of acquiring a wet blue skin image in an automatic calculation method for a surface defect area of a wet blue skin based on a Deeplab V3+ model according to an embodiment of the present disclosure is provided. As shown in FIG. 2, the capturing field of vision of an industrial camera has a horizontal field of view and a vertical field of view, and the actual area of the image captured by the camera can be calculated according to those two field of views. The camera used in the present disclosure is provided by DAHENG IMAGING, and the horizontal field of view and the vertical field of view are 76.9 degrees and 61.5 degrees, respectively.

Embodiment 5

Figure 3:
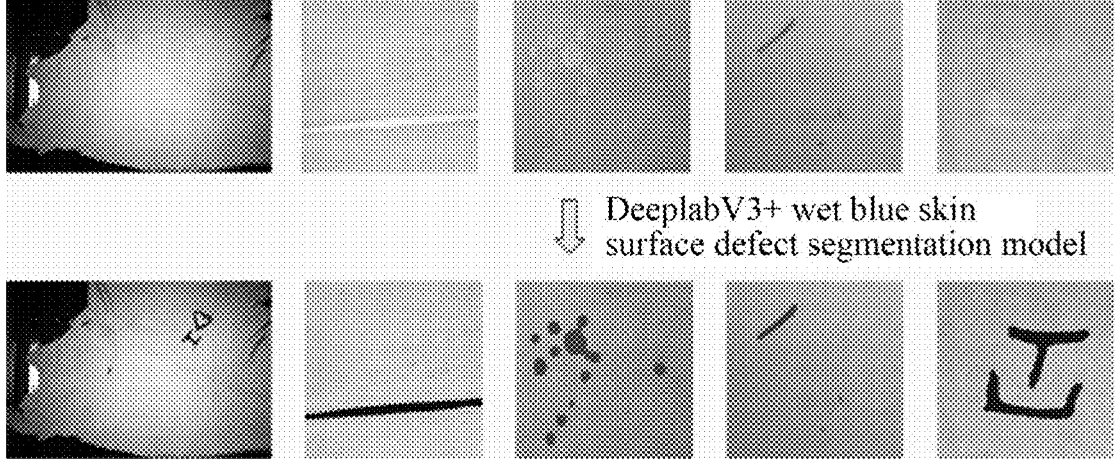
FIG. 3 are pictures showing segmentation results of surface defects of a wet blue skin.

Referring to FIG. 3, an automatic calculation method for a surface defect area of a wet blue skin based on a Deeplab V3+ model according to an embodiment of the present disclosure is provided. The trained defect segmentation model based on the DeeplabV3+ model is used to complete the detection of the wet blue skin image. The wet blue skin image which is not used for training is imported into the trained DeepLabV3+ model for detection. From the detection results, it can be seen that the model can well segment the defects such as knife holes and brands, and the detection rate is about 1 s per wet blue skin image.

The embodiment of the present disclosure provides an automatic calculation method for a surface defect area of a wet blue skin based on a DeeplabV3+ model. By applying the DeeplabV3+ model to actual production, the method can segment different surface defect of the wet blue skin, and then calculate the actual surface defect area of each wet blue skin according to the segmentation result, so as to assist quality inspectors in determining the quality grade of the wet blue skin and solve the problems that the surface defect of the wet blue skin cannot be quantified.

It is obvious to those skilled in the art that the embodiments described in the present disclosure are some embodiments of the present disclosure, rather than all of the embodiments. The embodiments in the present disclosure and the features in the embodiments can be combined with each other without conflict. The components of the embodiments of the present disclosure, which are generally described and shown in the drawings herein, can be arranged and designed in various different configurations. Therefore, the detailed description of the embodiments of the present disclosure is not intended to limit the claimed scope of the present disclosure, but only represents selected embodiments of the present disclosure. Based on the embodiments in the present disclosure, all other embodiments obtained by those skilled in the art without creative labor belong to the scope of protection of the present disclosure.

What is claimed is:

1. An automatic calculation method for a surface defect area of a wet blue skin based on a DeeplabV3+ model, comprising:

Step 1, using an industrial camera to acquire more than 500 wet blue skin image samples of animal skins after main tanning, wherein the animal skins comprising cowhides, sheepskins and pigskins; performing preprocessing comprising cropping and selecting, on the wet blue skin images acquired, and carrying out data annotation on preprocessed images with an annotation software to construct a wet blue skin surface defect semantic segmentation data set;

Step 2, training a Deeplab V3+ model by using the wet blue skin surface defect semantic segmentation data set created, and obtaining a wet blue skin surface defect segmentation model based on the Deeplab V3+ model;

Step 3, using the wet blue skin surface defect segmentation model based on the Deeplab V3+ model trained to conduct defect detection on the wet blue skin image, acquiring segmentation result images of different defects in the image, and calculating a proportion of each defect in the image ($k_i$);

Step 4: calculating actual surface defect area of a wet blue skin according to following equations:

$$S_t = \sum_{i=1}^{n} S \times k_i,$$

$$S = 4 \times H^2 \times \tan\frac{\alpha}{2} \times \tan\frac{\beta}{2}$$

where S is an actual area captured by the camera, H is a distance between the camera and the wet blue skin, $\alpha$ is a horizontal field of view of the camera, $\beta$ is a vertical field of view, $S_t$ is the actual surface defect area, and $k_i$ is the proportion coefficient of different defects in the image.

2. The method according to claim 1, wherein the wet blue skin image samples are captured by using one or more industrial area-array cameras or industrial single-scanline cameras with more than 2 million pixels.

3. The method according to claim 1, wherein in Step 1, after completion of the data annotation of the wet blue skin, the wet blue skin surface defect semantic segmentation data set is divided into a training set and a verification set according to a ratio of (1.5 to 9):1, and a number of images in the training set is greater than that in the verification set.

4. The method according to claim 1, wherein in Step 2, in the Deeplab V3+ model, a MobileNetV2 network is used as a backbone feature extraction network, which, in combination with technologies comprising dilated convolution and spatial pyramid pooling, improves real-time performance and segmentation accuracy, so that calculation amount and parameter amount are reduced, a number of channels is increased, and more features in the image are obtained.

5. The method according to claim 1, wherein in Step 3, segmented defects of wet blue skin comprise, common defects comprising knife holes and brands, and the calculating a proportion of each defect in the image is not limited to one type of defects.

* * * * *